Aug. 31, 1943.   R. A. WITTMANN   2,328,521
UNIT AIR CONDITIONING SYSTEM
Filed Dec. 9, 1939   3 Sheets-Sheet 2

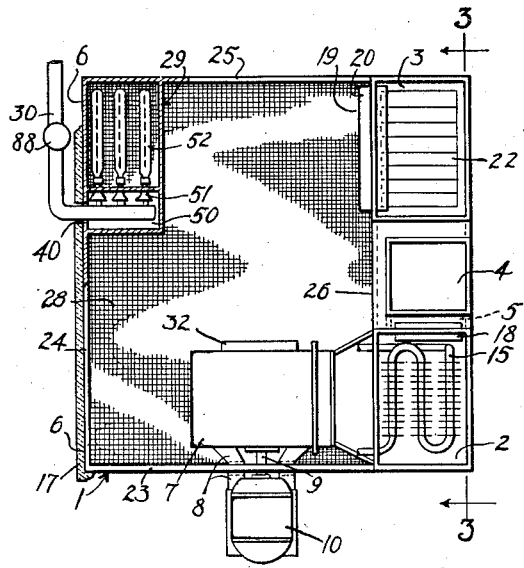
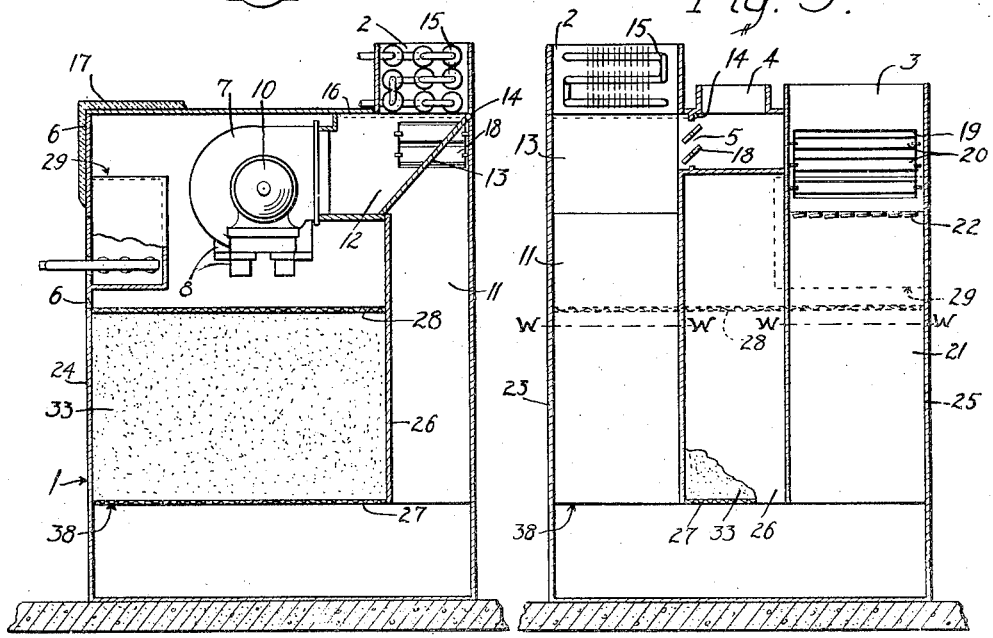

Inventor:-
Robert A. Wittmann.
By Brown, Jackson, Boettcher & Dienner
Att'ys.

Aug. 31, 1943.　　　R. A. WITTMANN　　　2,328,521
UNIT AIR CONDITIONING SYSTEM
Filed Dec. 9, 1939　　　3 Sheets-Sheet 3
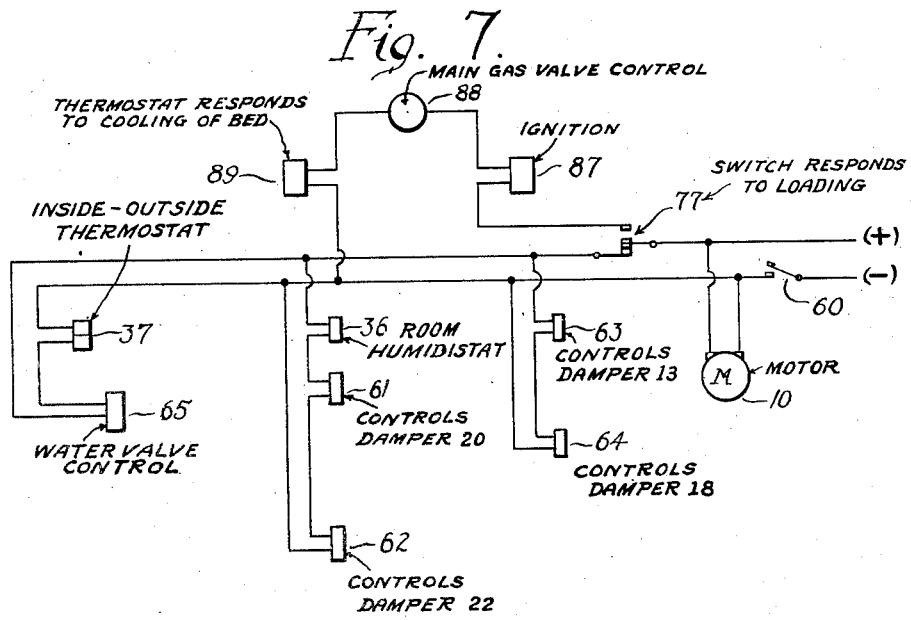
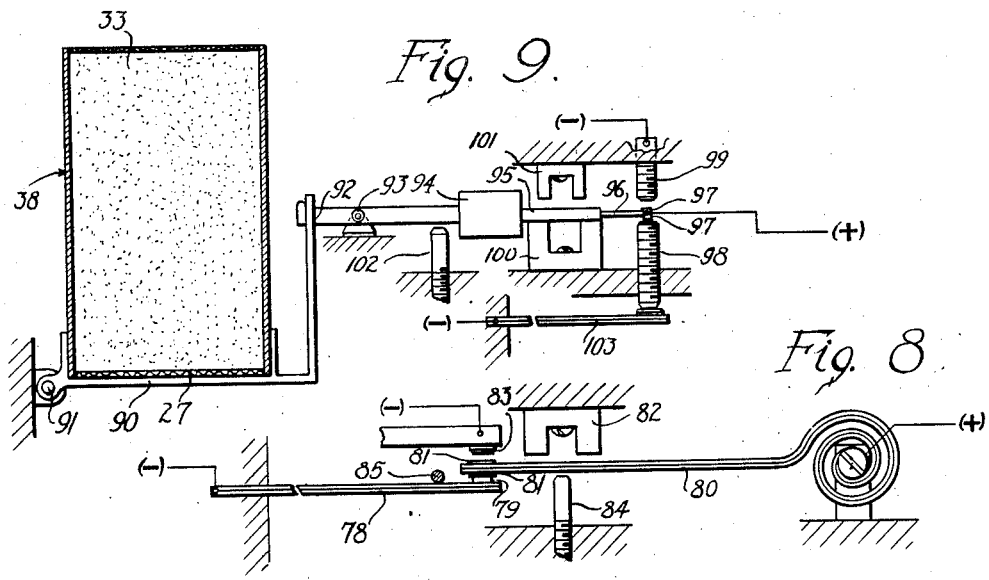
Inventor:—
Robert A. Wittmann.
By Mawrjaeken Boeucke Drewer
Attys.

Patented Aug. 31, 1943

2,328,521

UNITED STATES PATENT OFFICE 2,328,521

UNIT AIR CONDITIONING SYSTEM

Robert A. Wittmann, Chicago, Ill., assignor to Chicago By-Products Corporation, a corporation of Illinois Application December 9, 1939, Serial No. 308,355

9 Claims. (Cl. 183—4.1)

This invention relates to a unit air conditioning system. The purpose of the system is to provide a compact, quite inexpensive summer air conditioning unit permitting comfortable conditions as desired by means of a new method of control and which system can be reactivated at times when the unit is not needed.

Means for dehumidifying and cooling air for comfort are old, but my new construction has certain structural and functional advantages not heretofore availed of, especially for individual room summer air conditioning.

In devices of the prior art it has been customary to regulate the relative humidity and dry bulb temperature at a constant fixed condition (e. g., threatres with signs advertising "68° cool inside") and also to regulate both conditions at the same time. Generally in such arrangements there is such a great temperature differential between the inside cooled rooms and the outdoor temperature that a person passing from the cooled to the outside temperature is withered by the sudden change to the high ambient temperature.

My invention overcomes this condition by permitting maintenance of the dry bulb temperature at any desired point (preferably just a few degrees lower than outdoor temperature), and yet giving a comfortable atmosphere by holding the relative humidity to any desired point, independent of the dry bulb temperature (but preferably at a much lower degree than in general practice). The further advantage of my appliance in this connection is that the operator is able to control either manually or automatically the dry bulb temperature or relative humidity, one independent of the other, or in any desired relationship to the outdoor conditions.

The invention, therefore, has reference to a new and novel conditioning unit involving a new method of control.

The primary object of the invention is to provide a compact inexpensive summer air conditioning unit which shall be automatic or semi-automatic in its operation.

The principle upon which the invention proceeds is to extract moisture from the air to be conditioned without reducing the temperature to the dew point, preferably through the use of an adsorptive medium. This principle broadly is known, but so far as I am aware the provision of an automatic or semi-automatic unit installation has not heretofore been accomplished.

According to the preferred practice of my invention the extraction of moisture by an adsorptive medium is carried on under automatic humidistatic control until the medium approaches saturation, whereupon the regeneration cycle is instituted. The amount of medium utilized may be great enough to carry on the desired adsorption of the particular space for the major part of the day, for example, ten or twelve hours. Then the approaching saturation renders regeneration necessary. This may be done automatically by suitable means which is capable of responding to saturation or approximate saturation. One such indication of saturation is the increase in temperature of the adsorptive medium known as a combination of the heat of wetting and the heat of adsorption. Another indication which may be used in the increase in weight due to the adsorbed moisture. Other indications may be employed.

The reactivation cycle may be automatically instituted by means responsive to the particular indication selected. Since adsorption rarely need to be carried beyond ten or twelve hours the regeneration may be caused to occur during the night time and upon completion of regenerating action the machine may be shut down. Regeneration may be carried on in a relatively short time.

Alternatively two adsorptive bodies may be utilized with overlapping periods of adsorption and regeneration so that while one body is being regenerated the other may be carrying the load of removing moisture. The cycling of a single body or of multiple bodies of adsorptive material may be automatically operated on a time cycle as by the control of an electric clock.

In the practice of my invention I preferably employ as an adsorbent medium a body of flakes of silicon dioxide such as are known as "Lamisilite" (see patent to Guthrie and Wilbor No. 1,898,774). This medium is particularly suitable inasmuch as it has in certain forms thereof the ability to adsorb as much as 18–20% of its weight of moisture. The invention is not to be confined to this specific medium as other adsorptive media are known and may be used, regard being had to their limitations.

A further important object of this invention is to automatically stop the adsorbing cycle (as distinguished from the reactivating cycle) when the adsorbent has reached its adsorbing capacity and automatically start the reactivating cycle.

A further object of the invention is to use gas as the source of energy for the reactivating cycle.

Another object of my invention is to have the gas burner or burners used for reactivating the adsorptive material burned directly in the air used for reactivation, but so placed that the primary air from outside the unit to the gas burners is in no way influenced by the fan in the unit.

Still another object of my invention is to provide for recycling of the air within the unit during reactivation; such recycling to continue until the adsorbent material and all the air handled by the fan reach a predetermined desired temperature before being completely exhausted to the outdoors.

Another important object of my invention is to automatically stop reactivation when a predetermined and desired temperature of the adsorbent material has been reached.

In order to enable those skilled in this art to understand the invention fully, both from a structural and functional standpoint, in the accompanying drawings, forming a part of this specification and to which reference should be had in connection with the following description, a present preferred embodiment of the air conditioning system has been illustrated in detail. For simplicity, like reference numerals have been employed to designate the same parts throughout the several views.

Figure 1 is a plan view of the unit with the top panel removed;

Figure 2 is a front elevation with the front panel removed;

Figure 3 is a sectional view taken along line 3—3 of Figure 1 looking in the direction of the arrows;

Figure 7 shows a diagrammatic sketch of one method of control for this new apparatus;

Figure 8 shows an enlarged view of the thermostatic control 77 of Figure 7; and

Figure 9 shows another means of automatically controlling switch 77 of Figure 7.

Figure 4:
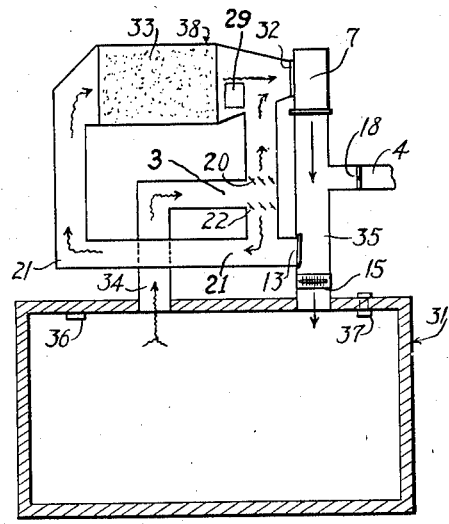
Figure 4 is a diagrammatic representation of the unit during the adsorption cycle, the arrows indicating direction of air flow through the unit.

In Figures 1, 2, 3 and 6 either all insulation on the outside of the unit, or nearly all insulation, has been removed to show the machine more clearly. But in the preferred embodiment of my invention, the unit is completely encased by a coating of insulation such as plastic asbestos or prefabricated asbestos board.

Referring now to the drawings more specifically:

In Figure 1 there is shown a sheet metal housing 1 of appropriate size and shape, completely insulated against loss of heat from within the unit by an insulating material 17, such as plastic asbestos or asbestos board, and having an air-discharge opening 2, an open-return opening 3, a discharge vent 4 connected to the air-discharge opening 2 through passageway 5, and a removable panel 6.

Internally, the casing 1 contains a fan 7 mounted on supports 8, the fan shaft 9 carried on bearings outside the unit and extending through the casing 1 to electric motor 10 properly supported by extension of supports 8. Referring to Figure 2, the discharge of the air from fan 7 passes through the duct 12, then through cooling coils 15 in the air-discharge opening 2, while the damper 13, pivoted at 14, is in position as shown. When damper 13 is in position 16, as indicated by dotted lines, all the air discharged from the fan flows through duct 12 into duct 11. Damper 13 may be in any intermediate position, thus allowing a corresponding part of the air discharged by fan 7 to pass through duct 12 and opening 2 and another part to pass through duct 12 and duct 11.

Referring to Figure 3, there is a damper 18 in passageway 5 between the air-discharge opening 2 and vent 4, and through this damper, when open, some of the air flows to the discharge vent 4.

The return-air opening 3 is so constructed that the return air can all pass through opening 19 with damper 20, and thus by-pass the adsorbent bed, mix with the dried air and then pass to the fan, or all the air can pass through the duct 21 with damper 22, or the air may pass through both opening 19 and 21 in any proportion desired.

A compartment 38 is formed by sides 23, 24, 25, partition 26, and lower screen 27 and upper screen 28 which holds the "Lamisilite" 33 or any other suitable adsorptive material. Except for the gas burner assembly 29 and fan 7, the space above the screen 28 contains nothing but air. The space below screen 27 also is vacant but for air.

In the upper part of the casing 1 is located a complete gas burner assembly 29. The gas supply enters the burner 29 through pipe 30 having a gas control valve 88. The hole 40 in casing 1 through which gas supply pipe 30 passes, is of a diameter larger than pipe 30, thereby permitting the primary air to the burner, i. e., air from outside of the unit, to be undisturbed by the action of the fan 7 inside the air conditioning unit. The primary air passes through hole 40 to the chamber 50 whence the air passes through each of the mixing chambers 51 of the three burners 52 into the burners 52. The compartment 50, containing the mixing chamber 51 and gas supply tube 30 and primary air supply, is shown in Figure 1 with the top removed. In actuality, compartment 50 is completely closed except for hole 40. But there is no top or bottom to that portion of the burner assembly 29 which houses the burners 52, since the air must be free to pass up and by the burners during reactivation.

In Figure 4 the diagrammatic representation shows the position of the dampers and the general cycle during the dehumidification and sensible cooling period. The fan 7 draws the recirculated air from the air conditioned room 31 through the return-air duct 34 which is connected to the inlet 3 of the casing. The dampers 20 and 22 are adjusted (by a method of adjustment to be more fully described hereinafter) so that the proper portion of air passes through the duct 21 and through the adsorptive material 33 in the adsorption bed 38 and hence to the inlet 32 of the fan 7. The remaining recirculated air by-passes through the damper 20, mixes with the dehumified air, and flows into the fan 7 through inlet 32. The fan 7 then discharges the air through the air-discharge duct 35 and through the cooling coil 15 to the room 31. Throughout this adsorption cycle, the damper 13 is in the lower position as in Figure 2 to prevent by-passing of the air in duct 35 back through the adsorption bed, and at the same time damper 18 is closed to prevent the air from being discharged to the vent 4. The humidistat 36 and the double thermostat 37 in the room 31 will be more fully described below.

Figure 5:
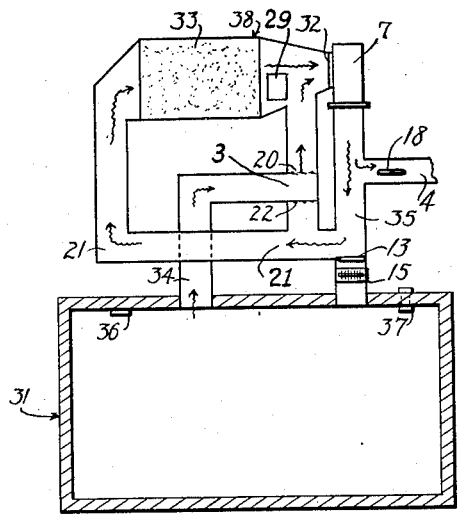
Figure 5 is a diagrammatic representation of the unit during the reactivation cycle, the arrows indicating direction of air flow through the unit.

In Figure 5 the diagrammatic representation shows the position of the dampers and the general cycle during the reactivation period. Damper 22 is shut tight so that the slight amount of air being drawn from the room 31 by the fan 7 will have to pass through damper 20 which is opened a small amount. The vent damper 18 is open and the damper 13 is in the position shown (corresponding to position 16 of Figure 2). The fan 7 draws the largest portion of the air through duct 21 and through the adsorption bed 38, after which it mixes with the air from duct 34 and damper 20. This mixed air is then heated by the burner 29, goes to the fan inlet 32 and then is recirculated. Damper 18, being open, allows a small amount of the air to pass out the vent 4.

Figure 5A:
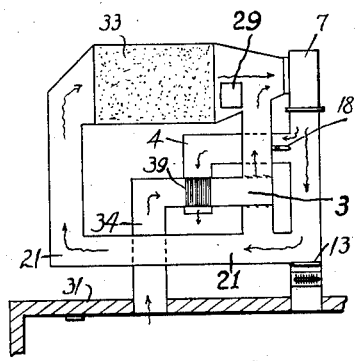
Figure 5a is a diagrammatic representation of the unit during the reactivation cycle with a preferred arrangement of the exhaust vent.

In Figure 5a also, the diagrammatic representation shows the position of the dampers and the general cycle during the reactivation period. But here the vent 4, carrying the portion of the air which is exhausted to the outside, allows for a heat interchange between this very hot exhaust air (approximately 250°) and the incoming air (approximately 80–85°) which is drawn from the room. This is accomplished by the exhaust air flowing through the tubes 39 which pass through the return air duct 34. This results in a more economical running of the unit since the hot exhaust air transfers some of its otherwise waste heat to the incoming air in duct 34 which hot air is used to dry out the adsorptive material during reactivation.

Figure 6:
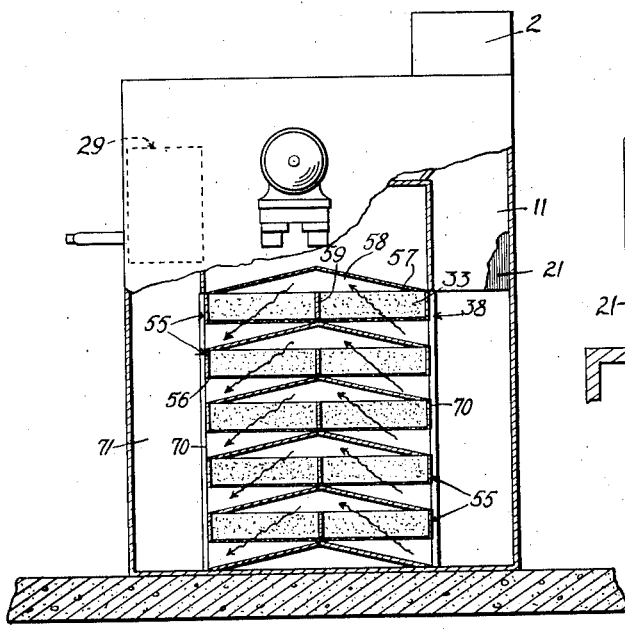
Figure 6 shows the front view of the air conditioning unit again with a portion of the front side broken away to show one preferred arrangement of the adsorption bed which reduces the resistance of air flow through the adsorptive material.

In Figure 6 is shown one preferred arrangement of the adsorption bed 38 wherein the "Lamisilite" or other adsorptive material 33 is set in successive layers in pans 55 each pan having a screen 56 on the bottom side, a roof 57 over the pan leaving an air space 58 between each layer of the adsorptive material 33 and its corresponding roof 57, a partition 59 running the length of each pan which divides the adsorptive material 33 into two equal sections and forces the air flow (indicated by arrows) to pass up through each pan and adsorbent on one side of partition 59 into the air space 58, and then down through the adsorbent of the same pan on the other side of partition 59. Running vertically along the sides of the pans 55 and fastened thereto are strips of metal 70 which support the pans 55 and allow ample room for air to pass from the duct 21 (see Fig. 3) to the pans. In this arrangement of the adsorbent bed the ducts 11 and 21 (see Figure 3) will be shortened and will extend only to the line w—w of Figure 3. The dehumidified air from the pans is drawn up the duct 71 to the upper portion of the air conditioning unit, past the burner 29 and into the fan.

In Figure 7 I show an electrical diagram of one method of control for this new air conditioning unit. The hand operated switch 60 puts the entire system into operation. We will now assume that the dehumidifying cycle is started when switch 60 is closed. Motor 10 goes into operation, starting the fan. The humidistat 36, which is in the room to be cooled, is set to a desired reading and this humidistat controls the position of dampers 20 and 22 by a modulating action through control 61 for damper 20, and control 62 for damper 22. If the relative humidity increases above the desired amount, damper 22 will automatically be opened a little more, permitting more air to go through the adsorption bed 38, and damper 20 will automatically be closed a little more, permitting less air to by-pass to the fan 7, with a result that with more air being dehumidified the air leaving the fan will contain less moisture and the humidity in the room will drop to the desired amount. If the humidity is too low the action of dampers 20 and 22 will be reversed.

Element 63 is a control element which adjusts the position of the damper 13. During the dehumidifying cycle the damper is in the position shown in Figure 2 in full lines. During the period of regeneration damper 13 is moved to the dotted line position 16 shown in Figure 2.

Element 64 is a control element which operates damper 18. Damper 18 is closed during the dehumidifying cycle and is open during the regeneration cycle.

The double thermostat 37 has one thermostat located in the room to be air conditioned and the other thermostat out of doors. This double thermostat maintains the desired dry bulb temperature in the room, which temperature is preferably 5° cooler than the out of doors temperature. This double thermostat controls the amount of cooling medium through the coil 15 by means of the water valve 65 which may be a modulating, on or off, or a by-pass type. The cooling medium may be a compressed refrigerant, well water, or even city water—since the temperature differential desired between outdoors and the cooled room is only a few degrees—brine or evaporative cooling by any suitable medium.

In the bed of "Lamisilite" or other adsorbent is a double acting thermostat 77. This thermostat 77 is shown in detail in Figure 8 and consists of a bi-metallic strip 78 free to move under temperature change and located in the air just above the adsorbent, with an electric contact 79; another bi-metallic strip 80 of the same characteristics as strip 78 and set in the upper flakes or grains of the adsorptive with an electric contact 81 on either side of the end of the strip 80; a permanent magnet 82 and a fixed electric contact point 83. The two bi-metal strips 78 and 80 ordinarily will have a constant relative position between themselves. Under an increase or decrease of temperature, each will move in the same direction and thus keep in contact with the other. With the hand switch 60 (of Figure 7) closed, the thermostat 77 (of Figure 8) is in position to set the dehumidifying cycle in action, i. e., bi-metallic strip 78 is in contact with bi-metallic strip 80.

When air is dehydrated with an adsorptive material the latent heat of condensation is converted into sensible heat and is picked up by the air with a natural increase in its dry bulb temperature. The amount of increase in temperature will depend on the moisture content in the air to be dehumidified. A small amount of moisture will cause only a slight increase in temperature, while a large amount of moisture in the air will cause a large increase in the dry bulb temperature. Therefore, it is evident that the thermostat 77 will be placed in a position where the ambient temperature changes.

During adsorption there is another heat producing phenomenon which is known as the heat of wetting—it is produced as the adsorbent takes on moisture—and this increases the temperature of the adsorbent. This action will first take place at the bottom of the adsorptive and then work upward till the bed is incapable of further adsorption. At this time the upper layer of flakes or grains gets this increase of temperature which causes the thermostat 80 to move further upward, and break contact with thermostat 78, since the strip 78, not being in the adsorbent, will not be affected by the heat of wetting. The circuit when broken by this temperature differential stops the dehumidifying and cooling cycle and damper 13 is moved to position 16 (see Figure 2), damper 18 opens, damper 22 closes, damper 20 closes almost completely, water valve 65 closes and the unit is ready for reactivation.

When the bi-metallic strip 80 breaks contact with strip 78 it makes contact with the fixed electric contact point 83 and there may be inserted to assure firm contact of 78—83, the small permanent magnet 82 which will hold the strip in position because of the attraction of the magnet for the ferrous layer of the bi-metallic strip 80. Contact between contact points 83 and 81 of the fixed contact and the bi-metallic strip 80, respectively, closes the reactivating circuit. This opens the main gas valve 88 and the safety pilot 87 (electric ignition) and lights the burners 52.

The contacts of thermostat 89, which is also in the adsorbent bed 38, are already closed. When the temperature reaches 250° F., the thermostat 89 breaks contact, thus opening the circuit and shutting off the burner. The adsorptive material is then at a temperature where it gives off substantially all adsorbed water vapor.

In the switch 77 the bi-metal strip 80 keeps contact with contact point 83 as long as the temperature is above 110°. During reactivation, bi-metallic strips 78 and 80 are at the same temperature but stop 85 prevents the strip 78 from reaching strip 80 until after the contact between 80 and 83 is broken and the adsorbent has cooled to 110° F. Then the continued circulation further reduces the temperature and at 100° F. the contacts of thermostat 89 reclose.

Non-conducting screw 84 may be manually moved upward following the strip 80 (but not contacting it) as strip 80 breaks with strip 78 and makes contact with contact point 83 at close of dehumidification and cooling cycle. This screw will then prevent bi-metal strip 80 from automatically re-engaging strip 78 at the close of the reactivation cycle which re-engagement would otherwise start the dehumidification and cooling cycle again. Thus the unit may be automatically shut down when the regeneration is complete.

In Figure 9 is shown a substitute for the thermostatic switch 77. Here the adsorbent bed 38 is borne in the air conditioning unit by a frame 90 which permits air flow up through the screen 27 and the adsorbent 33. The frame 90 is supported on a pivot 91 and an arm 92 which is pivoted at 93 and counterweighted by weight 94. The extension of arm 92 beyond the counterweight 94 has a ferrous portion 95 and a strip 96 having upper and lower electric contact points 97. Strip 96 contacts fixed contact 98 and represents the circuit as closed for the dehumidification and cooling cycle. The adsorbent 33 will become heavier and heavier due to the moisture adsorbed from the air. When it has adsorbed a predetermined amount, its weight will exert just enough force on the arm 92 to overcome the counterweight 94 and attraction of the permanent magnet 100 for ferrous extension 95 and thus cause the arm 92 and its extensions 95 and 96 to pivot about 93 and cause 95 to break away from permanent magnet 100 and strip 96 to break away from stationary contact 98 and stop the dehumidification and cooling cycle. The arm 92 will then be in such a position that extension 95 will be held by permanent magnet 101 and strip 96 will make electric contact with stationary contact 99. This contact will automatically close the circuit for the reactivation cycle which was described above. The permanent magnets are employed to provide a snap action of the switch. One or both may be omitted, or the snap action may be secured by other known means.

The arm 92 will not return to its previous position and allow strip 96 to re-contact stationary contact 98 until the moisture has been completely driven from the adsorbent 33. Only when the adsorbent is dried will the counterweight exert enough force to pull extension 95 from permanent magnet 101 and allow it to rotate about point 93 and stop at permanent magnet 100, and at the same time allow trip 96 to re-contact 98. Thermostat 103 engages stationary contact 98 during dehumidification and cooling cycle. During reactivation the heat in the unit causes thermostat 103 to break contact with 98. It does not reengage the contact point 98 after reactivation until the temperature has dropped to 110° F. Then contact is made between 103 and 98 and the dehumidification and cooling cycle begins again. Non-conducting screw 102 serves the same purpose here as screw 84 of Figure 8, i. e., it may be manually set as the reactivation cycle begins so as to physically prevent the electric contact points 97 and 98 being otherwise automatically re-engaged to set the dehumidification and cooling cycle in operation again.

I do not intend to be limited to the details shown or described except as they are recited in the appended claims, as modifications will readily suggest themselves to those skilled in the art.

I claim is my invention:

1. In combination, a body of adsorbent for dehumidification of a room, fluid impelling means adapted to be continuously driven, a duct leading from the room to said body and through said impelling means, a bypass duct around said body, a delivery duct from the impelling means to the room, a room humidistat and means controlled thereby for controlling the bypass to regulate the rate of dehumidification effected by the body, a valved bypass from the delivery duct of the impelling means to the intake side of the body, control means responsive to the loaded condition of the body for causing operation of the valve of the bypass to provide a substantially closed fluid circuit which includes said impelling means, said body and said valved bypass, and heating means disposed in said closed circuit and governed by said control means to heat the fluid in said substantially closed circuit.

2. In combination, a body of adsorbent for dehumidification of a room, fluid impelling means adapted to be continuously driven, a duct leading from the room to said body and through said impelling means, a bypass duct around said body, a delivery duct from the impelling means to the room, a room humidistat and means controlled thereby for controlling the bypass to regulate the humidity of the delivered air, a valved bypass from the delivery duct of the impelling means to the intake side of the body, control means responsive to the loaded condition of the body for causing operation of the valve of the bypass to provide a substantially closed fluid circuit which includes said impelling means and said body, and heating means disposed in said closed circuit and governed by said control means to heat the fluid in said substantially closed circuit, and manually operable means for adjusting the control means to shut off the heating means without causing operation of the valve of the bypass.

3. An air treating unit comprising a closed rectangular cabinet divided into an inlet compartment, an outlet compartment in the upper end of the cabinet, and an adsorbent containing compartment between said compartments, an inlet duct extending from the upper end of the cabinet to the inlet compartment, an inlet control valve in the upper end of said inlet duct, a valved bypass extending from the outlet compartment to the inlet duct, a blower in the outlet compartment having its intake open to the outlet compartment, a blower motor external of the outlet compartment, a gas burner disposed in said outlet compartment, a discharge duct leading from the discharge of the blower to the outside of the cabinet, a vent duct having a controlling valve and leading from the discharge duct to the outside of the cabinet, a bypass duct extending from the discharge duct to the inlet compartment, a two-way valve at the junction of the bypass duct and the discharge duct, said ducts being disposed inside the cabinet.

4. In combination, a body of adsorbent material, a blower and ducts for passing a stream of air to be dried through said body, a heater for heating air for drying said body, a duct and valve means for placing said blower in series relation to said heater and said body to cause drying of said body, means controlled by loading of said body with moisture to shift said valve means to cause circulation of heated air through said body, a thermostat responsive to the temperature of said body for putting said heating means out of operation without discontinuing said circulation, and thermostatic means responsive to cooling of said body for shifting the valve means to discontinue circulation.

5. In combination within a self contained air conditioning cabinet employing a single body of adsorbent for effecting dehumidification of a room, an inlet chamber in one end of said cabinet, an outlet chamber in the other end of said cabinet, an adsorbent containing compartment between said compartments, an inlet duct leading from the exterior of said cabinet to the inlet chamber, the outer end of which duct is adjacent said outlet chamber, a port between the outer end of said inlet duct and said outlet chamber whereby fluid may bypass said adsorbent, a valve in said port, a valve in said inlet duct beyond said port, valve control means subject to a humidistat in the room to be conditioned for jointly regulating said valves to control the humidity of the fluid to be discharged from said cabinet, a gas burner in said outlet chamber for supplying heat and hot gases of combustion during reactivation of said adsorbent, an outlet duct, a blower adapted for continuous operation, said blower having its inlet open to said outlet chamber and its discharge open to said outlet duct, a vent duct, a bypass duct, said outlet duct intersecting at one point said vent duct and said bypass duct, said vent duct leading to the exterior of said cabinet and said bypass duct leading to said inlet chamber, a valve in said vent duct and a two-way valve at the intersection of said outlet duct and said bypass duct, an electric control circuit for operating said valves and said gas burner, and an electric switch element in said adsorbent which is adapted to be actuated by the loading of said adsorbent, operation of said switch energizing said electric control circuit to start said gas burner and change the fluid path from the following dehumidification circuit, namely, the inlet duct and its cooperating port, the inlet chamber, the body of adsorbent, the outlet chamber, the burner, the blower and the outlet duct, to the following reactivating circuit, namely, the upper end of the inlet duct, the port, the gas burner, the outlet chamber, the blower, the bypass duct, the inlet chamber, the adsorbent body, the outlet chamber, the burner, the blower and the vent duct.

6. In combination in a fluid conditioning unit employing an adsorbent body which needs periodic reactivation, heat supplying means and an automatic electric control mechanism in said adsorbent responsive to the loading of said adsorbent to stop dehumidification of fluid and commence reactivation of said adsorbent by said heat supplying means, said control mechanism comprising an energized bimetallic thermostat in the upper layer of the adsorbent, a second bimetallic thermostat immediately above said adsorbent and in contact with said first thermostat, said thermostats maintaining contact during fluctuations in ambient temperature but said first thermostat breaking contact and closing the burner circuit to energize it when additional heat is supplied to said first thermostat by loading of said adsorbent.

7. An air conditioning unit for treating the air of a room comprising in combination, a main duct for air flow having inlet and outlet connections with the room, a body of adsorbent material, fan means and heating means in said main duct, a first by-pass duct in communication with said main duct for by-passing air around said body of adsorbent material, a second valved by-pass duct for by-passing said inlet and said outlet connections, the valve of said second valved by-pass duct being operable to provide a substantially closed fluid circuit between said second valved by-pass duct and said main duct including said adsorbent body, said fan means and said heating means, control means responsive to the loaded condition of the body of adsorbent material for causing operation of the valve of the second valved by-pass duct to provide said substantially closed fluid circuit between said second valved by-pass duct and said main duct, said control means governing said heating means to heat the air in said closed fluid circuit.

8. An air conditioning unit for treating the air of a room comprising in combination, a main duct for air flow having inlet and outlet connections with the room, a body of adsorbent material, fan means and heating means in said main duct, a first by-pass duct in communication with said main duct for by-passing air around said body of adsorbent material, valve means for closing off said first by-pass duct from said main duct, an exhaust duct connected to said main duct, a valve in said exhaust duct for opening and closing the same, a second valved by-pass duct for by-passing said inlet and outlet connections, the valve of said second valved by-pass duct being operable to provide a substantially closed fluid circuit between said second valved by-pass duct and said main duct including said adsorbent body, said fan, and said heating means, control means responsive to the loaded condition of the body of adsorbent material for causing operation of the valve of said second valved by-pass duct to provide the substantially closed fluid circuit between said main duct and said second valved by-pass duct, and opening the valve for said exhaust duct, said control means governing said heating means to heat the air in said closed fluid circuit.

9. The combination of claim 8 wherein the exhaust duct and the main duct are arranged to effect heat transfer between them.

ROBERT A. WITTMANN.